Nov. 18, 1924.  1,515,762
F. J. WAGNER
FLUID MEASURING DEVICE
Filed March 17, 1923   2 Sheets-Sheet 2

F. J. Wagner, Inventor

By C. A. Snow & Co.
Attorneys

Patented Nov. 18, 1924.

1,515,762

UNITED STATES PATENT OFFICE.

FRANK J. WAGNER, OF SHAMROCK, OKLAHOMA.

FLUID-MEASURING DEVICE.

Application filed March 17, 1923. Serial No. 625,772.

*To all whom it may concern:*

Be it known that I, FRANK J. WAGNER, a citizen of the United States, residing at Shamrock, in the county of Creek and State of Oklahoma, have invented a new and useful Fluid-Measuring Device, of which the following is a specification.

This invention relates to a fluid measuring device and more particularly a measuring device especially designed for measuring oil as it is being pumped from oil wells or the like.

The primary object of the invention is to provide a movable receiving member of a predetermined size whereby each filling of the receptacle will measure a predetermined quantity of fluid.

Another object of the invention is to provide means for automatically dumping the receiving member, novel means being employed and associated with the receiving member so that each movement of the receiving member to dump a quantity of fluid will be recorded.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
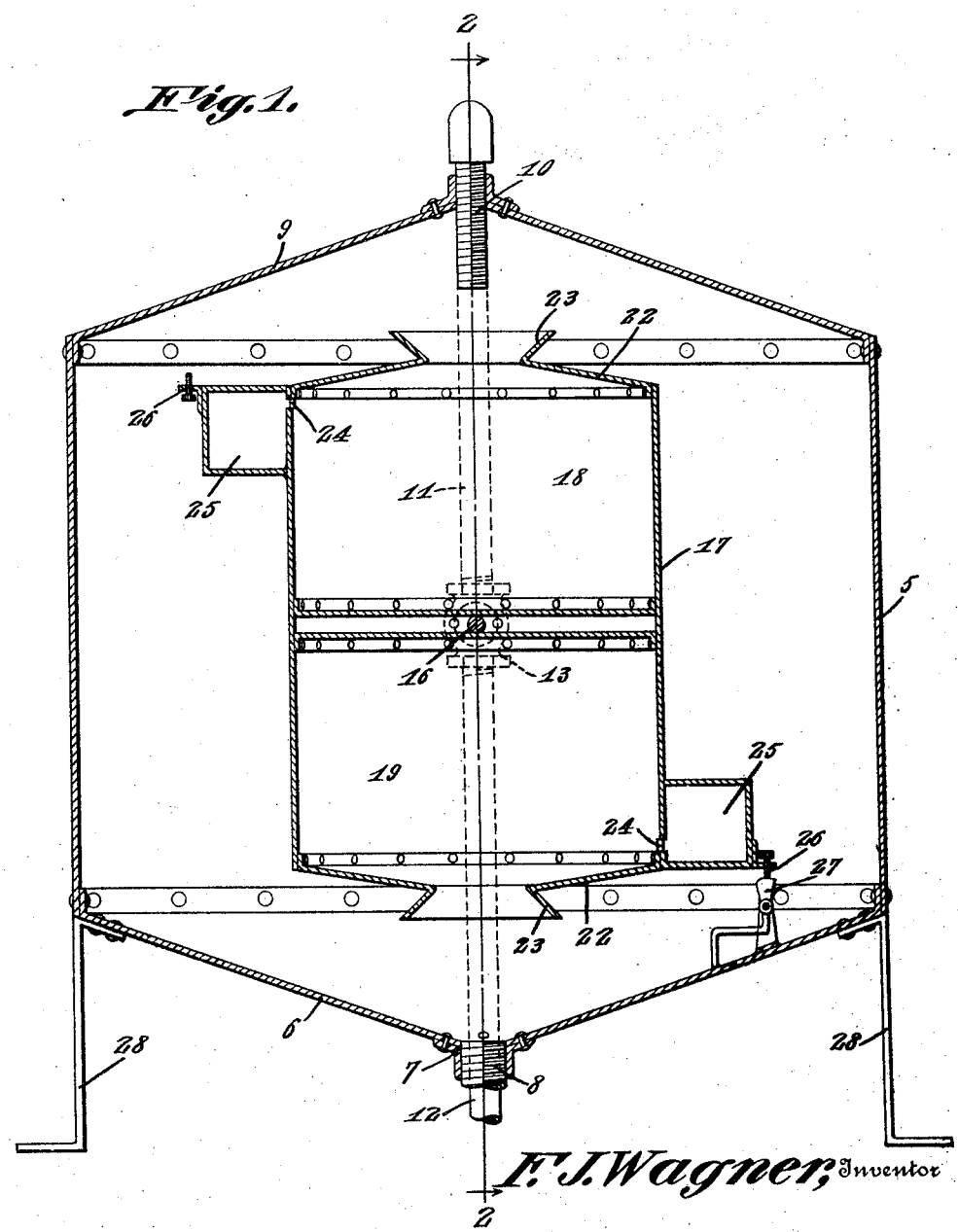
Figure 1 is a longitudinal sectional view through a measuring device constructed in accordance with the invention.

Referring to the drawings in detail, the reference character 5 designates a tank or housing which is formed preferably of sheet metal and provided with a funnel-shaped bottom portion 6 formed with a discharged opening 7 to accommodate the discharge pipe 8 whereby the contents of the tank or housing 5 may be carried off.

A cover 9 is secured to the upper end of the tank or housing 5 and is formed with an opening to accommodate the pipe 10 which is supplied with fluid passing through the pipes 11 and 12.

Connecting the pipe 11 and 12 is a valve housing 13 in which operates the valve 14 that is formed with a socket to accommodate the squared end 15 of the supporting shaft 16. This supporting shaft 16 extends through the housing 5 and provides a support for the receptacle 17, which is divided into compartments 18 and 19 each of which compartments being of a size to accommodate a predetermined quantity of fluid as for example "ten gallons." At opposite sides of the receptacle 17 are bearing members 20 that are formed with threaded openings to accommodate the set screws 21 that have their inner ends contacting with the shaft 16 to secure the receptacle 17 thereto.

At one end of each compartment is a cover 22 formed with a funnel-shaped opening 23 to admit the fluid passing from pipe 10, to the compartments of the receptacles, when the compartments are in their filling positions. Formed in the wall of the receptacle 17 at points adjacent to the ends thereof, are openings 24, which openings provide comunication between the compartments 18 and 19 and the auxiliary tanks 25 so that when fluid in the compartments 18 and 19 reaches a predetermined level, the fluid will overflow into auxiliary tanks.

A set screw indicated at 26 is carried by each of the auxiliary tanks and is adapted to move into engagement with the trip 27 supported within the housing 5 and lying in the path of travel of the screw, when the receptacle has been rotated to dump the contents of the filled compartments. Thus it will be seen that the set screw will rest on the tip 27, when the receptacle 17 is being filled to hold the receptacle temporarily, against movement.

It is to be understood that a registering device indicated at 29 is supported by the housing 5 and is operatively connected with the shaft 16 so that movement of the shaft with the rotation of the receptacle 17 causes the operation of the registering device.

Supporting legs 28 are secured to the bottom 6 of the housing 5 and support the housing in spaced relation with the surface on which the same is positioned.

Figures 2, 3:
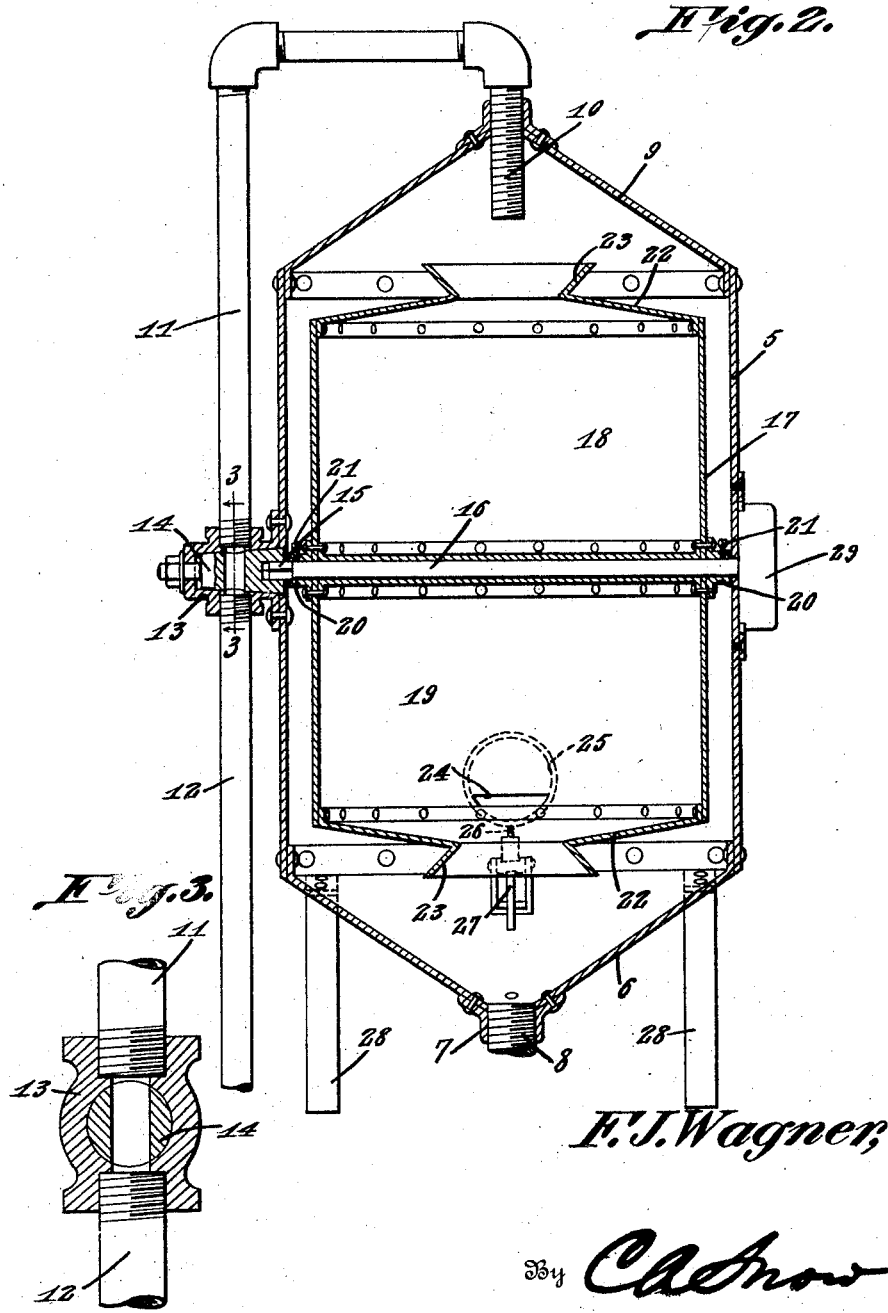
Figure 2 is a sectional view taken on line 2—2 of Figure 1.
Figure 3 is a sectional view taken on line 3—3 of Figure 2.

The operation of the device is as follows:

Assuming that the receptacle 17 is in a position as shown by Figure 2 of the drawing, the fluid passing through pipes 10, 11 and 12 is directed to the upper compartment 18 which fills with fluid until the fluid passes through the opening 24 and into the auxiliary tank 25 which is now in its uppermost position. It is obvious that as this tank 25 fills, the weight of the fluid in the upper compartment, together with the weight of the fluid in the upper auxiliary tank 25 overbalances the weight of the lower portion of the receptacle, causing the compartment 18 to move to the lower end of the housing, while the compartment 19 is automatically moved to the upper portion of the housing, or to a filling position.

Due to the fact that the receptacle 17 is secured to the shaft 16, each movement of the receptacle causes a relative movement of the valve member, to the end that the fluid passing through the pipes 11 and 12 is cut off during the rotation of the receptacle, but when one of the compartments is moved to a filling position, the valve is opened to admit fluid.

What is claimed as new is:—

1. In a measuring device, a housing, a movable member within the housing, said movable member being divided into compartments, said movable member adapted to normally lie in an upright position to receive fluid, an auxiliary tank in communication with each compartment, and disposed laterally thereof, said auxiliary tank adapted to fill with fluid when the fluid in the compartments reaches a predetermined level, the weight of the fluid in the auxiliary tanks adapted to overbalance the movable member to cause the movable member to dump the contents, and registering means actuated by movement of the movable member.

2. In a measuring device, a housing, a movable member positioned within the housing and having compartments, a pipe for delivering fluid to the housing and to the movable member, means for receiving fluid from the movable member to overbalance the movable member and cause the same to rotate within its housing, and means controlled by the movement of the movable member for controlling the passage of fluid through the pipe.

3. In a measuring device, a housing, a movable measuring member supported within the housing, means for dividing the movable member into compartments, means for normally holding the movable member in an upright position, a pipe for delivering fluid to the uppermost compartment, an auxiliary tank disposed laterally of each compartment and adapted to receive fluid therefrom to overbalance the movable member to dump the contents of the upper compartment, and a trip member actuated by the movement of the movable member.

In testimony that I claim the foregoing as my own, I have hereto affixed my signature in the presence of two witnesses.

FRANK J. WAGNER.

Witnesses:
J. A. SMITH,
R. B. CASKEY.